(12) United States Patent
Adams et al.

(10) Patent No.: US 8,551,431 B1
(45) Date of Patent: Oct. 8, 2013

(54) MERCURY REMOVAL FROM FLUE GAS STREAMS USING TREATED SORBENTS

(71) Applicant: Cabot Corporation, Boston, MA (US)

(72) Inventors: Patton Adams, Longview, TX (US); Dennis O. Rester, Longview, TX (US); Misty Williams, Marshall, TX (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 13/831,053

(22) Filed: Mar. 14, 2013

Related U.S. Application Data

(60) Provisional application No. 61/757,555, filed on Jan. 28, 2013.

(51) Int. Cl.
| | | |
|---|---|---|
| *B01D 53/64* | (2006.01) | |
| *B01J 20/00* | (2006.01) | |
| *B01J 20/02* | (2006.01) | |
| *B01J 20/30* | (2006.01) | |
| *B01J 20/32* | (2006.01) | |

(52) U.S. Cl.
USPC ............. 423/210; 95/234; 502/400; 502/406; 502/415; 502/437; 502/514; 502/516; 502/521; 502/60; 502/64; 502/11

(58) Field of Classification Search
USPC ................... 423/210; 95/234; 502/400, 406, 502/415, 437, 514, 516, 521, 60, 64, 11
See application file for complete search history.

(56) References Cited

U.S. PATENT DOCUMENTS

| | | |
|---|---|---|
| 6,004,896 A | 12/1999 | Addiego |
| 6,962,617 B2 | 11/2005 | Simpson |
| 7,572,421 B2 | 8/2009 | Yang et al. |
| 7,776,298 B2 | 8/2010 | Herden et al. |
| 7,858,061 B2 | 12/2010 | Varma et al. |
| 8,216,535 B2 | 7/2012 | Pollack et al. |
| 8,293,196 B1 | 10/2012 | Baldrey et al. |
| 2006/0204418 A1* | 9/2006 | Chao et al. ..................... 423/210 |
| 2008/0182747 A1 | 7/2008 | Sinha |
| 2010/0202946 A1 | 8/2010 | Yang et al. |
| 2010/0266468 A1 | 10/2010 | Yang et al. |
| 2011/0020205 A1* | 1/2011 | Kawamura et al. ...... 423/244.09 |
| 2012/0020855 A1 | 1/2012 | Bookbinder et al. |
| 2012/0020856 A1 | 1/2012 | Pollack |
| 2012/0100054 A1 | 4/2012 | Durham et al. |

FOREIGN PATENT DOCUMENTS

WO    WO2006050260    5/2006

OTHER PUBLICATIONS

Chojnacki, A., et al., The Application of Natural Zeolites for Mercury Removal: From Laboratory Tests to Industrial Scale, Minerals Engineering, 17, 2004, p. 933-937.

Durham, M., et al., Full-scale Evaluation of Mercury Control by Injecting Activated Carbon Upstream of ESPS, ADA-ES Publication No. 03006, presented at Air Quality IV, Arlington, VA, Sep. 22-24, 2003.

(Continued)

*Primary Examiner* — Timothy Vanoy

(57) ABSTRACT

A method for modifying the properties of a sorbent comprising washing a sorbent with a washing solution so as to achieve an exchange of ions between the sorbent and the washing solution, and applying a halogen compound to the sorbent that has been washed with the washing solution to achieve a predetermined concentration of the halogen on the sorbent.

31 Claims, 5 Drawing Sheets

(56) References Cited

OTHER PUBLICATIONS

Jurng, J., et al., Mercury Removal from Incineration Flue Gas by Organic and Inorganic Adsorbents, Chemosphere 47, 2002, p. 907-913.

Morency, J., et al., Control of Mercury Emissions in Utility Power Plants, TR-1113187-V3, presented at EPRI-DOE-EPA Combined Utility Air Pollutant Control Symposium: The MEGA Symposium, Atlanta, GA, Aug. 16-20, 1999.

Morency, J., et al., Laboratory Duct Injection of a Zeolite-Based Mercury Sorbent, presented at the Annual Meeting of the Air & Waste Management Association, Salt Lake City, UT, Jun. 2000.

Morency, J., et al., Zeolite Sorbent that Effectively Removes Mercury from Flue Gases, Filtration & Separation, Sep. 2002, p. 24-26.

Shevade, S., et al., Mercury Separation From Pollutant Water Using Zeolites, presented at ACS Environmental Chemistry Div. Symposia, Orlando, FL, Apr. 7-11, 2002.

\* cited by examiner

MERCURY REMOVAL FROM FLUE GAS STREAMS USING TREATED SORBENTS

PRIORITY CLAIM

This application claims priority from U.S. Provisional Application 61/757,555, filed Jan. 28, 2013, the entire contents of which are incorporated herein by reference.

TECHNICAL FIELD

The present disclosure relates to mercury removal and, more specifically, to mercury removal from flue gas streams using treated sorbents.

BACKGROUND OF THE INVENTION

Utility plants often seek to remove mercury from exhaust streams in order to comply with environmental regulations. Introducing an activated carbon into an exhaust stream is a common method for removing mercury. Once the activated carbon has removed mercury, it is captured by the plant, often in the same device that captures particulate matter or fly ash.

For various cost reasons, utility plants may seek to recycle collected fly ash as an additive or component in various building materials. For example, fly ash may be used as a concrete additive. Frequently, the fly ash utility plants seeks to recycle also contains the activated carbon used for mercury removal. Certain activated carbon can remain highly active and some activated carbons have been known to compromise the integrity of concrete. In particular, various activated carbons may have an affinity to adsorb air entrainment agents, which are added to concrete to increase durability.

SUMMARY OF THE INVENTION

According to embodiments of the present disclosure, disadvantages and problems associated with the performance of a sorbent may be reduced or eliminated.

In accordance with one embodiment, a method for modifying the properties of a sorbent comprises washing a sorbent with a washing solution so as to achieve an exchange of ions between the sorbent and the washing solution, and applying a halogen compound to the sorbent that has been washed with the washing solution to achieve a predetermined concentration of the halogen on the sorbent.

In accordance with another embodiment, the method for modifying the properties of a sorbent recited initially, wherein the sorbent is selected from the group consisting of mineral zeolites, synthetic zeolites, pumice, perlite, fly ash, alumina, diatomaceous earth, silicates, almuninosilicates, phyllosilicates, clay, peat, wood, lignocellulosic materials, biomass, waste, tires, olive pits, peach pits, corn hulls, rice hulls, lignite, brown coal, anthracite coal, bituminous coal, sub-bituminous coal, coconut shells, pecan shells, and walnut shells.

In accordance with another embodiment, the method for modifying the properties of a sorbent recited initially, wherein the sorbent is a zeolite and the zeolite is selected from the group consisting of chabazite, mordenite, erionite, faujasite, clinoptilolite, analcime, phillipsite, zeolite A, zeolite X, zeolite Y, zeolite L, zeolite omega, and ZSM-5.

In accordance with another embodiment, the method for modifying the properties of a sorbent recited initially, wherein the washing solution is an aqueous solution comprising a solute and the solute is selected from the group consisting of ammonium nitrate, ammonium bromide, ammonium carbonate, ammonium bicarbonate, ammonium chloride, ammonium perchlorate, ammonium hydroxide, ammonium sulfate, ammonium iodide, ammonium phosphate, and quarternary ammonium cations.

In accordance with another embodiment, the method for modifying the properties of a sorbent recited initially, wherein the washing solution comprises a greater than or equal to 0.001M ammonium nitrate or ammonium bromide solution.

In accordance with another embodiment, the method for modifying the properties of a sorbent recited initially, wherein washing the granularized zeolite with a washing solution comprises repeating the washing such that the sorbent receives a plurality of washes with the washing solution without reusing the washing solution between any of the plurality of washes.

In accordance with another embodiment, the method for modifying the properties of a sorbent recited initially, wherein the halogen compound is selected from the group consisting of bromine, chlorine, iodine, sodium bromide, calcium bromide, magnesium bromide, copper (II) bromide, iron (II) bromide, iron (III) bromide, zinc bromide, potassium bromide, copper (I) chloride, copper (II) chloride, iron (II) chloride, iron (III) chloride, and zinc chloride.

In accordance with another embodiment, the method for modifying the properties of a sorbent recited initially, wherein applying the halogen compound to the sorbent to achieve the predetermined concentration of the halogen on the sorbent comprises applying an aqueous solution comprising at least 20% sodium bromide by weight so as to achieve a final bromide concentration of at least 0.05% by weight.

In accordance with another embodiment, the method for modifying the properties of a sorbent recited initially, wherein applying the halogen compound to the sorbent to achieve the predetermined concentration of the halogen on the sorbent comprises spraying an aqueous solution onto the sorbent.

In accordance with another embodiment, the method for modifying the properties of a sorbent recited initially, further comprising milling the sorbent.

In accordance with another embodiment, the method for modifying the properties of a sorbent recited above, wherein the milled sorbent has a median particle diameter of approximately 20 micron on a volume basis.

In accordance with another embodiment, the method for modifying the properties of a sorbent recited initially, further comprising milling the sorbent and further comprising blending the milled sorbent with a second sorbent, wherein the second sorbent is an activated carbon.

In accordance with another embodiment, the method for modifying the properties of a sorbent recited initially, further comprising, prior to washing the sorbent with a washing solution, pre-washing the sorbent with a pre-washing solution so as to achieve an increase in the volume of pores of the sorbent with a pore size greater than or equal to 2 nanometers.

In accordance with another embodiment, the method for modifying the properties of a sorbent recited above, wherein the pre-washing solution is an aqueous solution comprising a solute and the solute is selected from a group consisting of sodium hydroxide, potassium hydroxide, calcium hydroxide, magnesium hydroxide, and ammonium hydroxide.

In accordance with another embodiment, the method for modifying the properties of a sorbent recited initially, further comprising, prior to washing the sorbent with a washing solution, pre-washing the sorbent with a pre-washing solution so as to achieve an increase in the volume of pores of the sorbent with a pore size greater than or equal to 2 nanometers and wherein the pre-washing solution comprises a greater than or equal to 0.05M sodium hydroxide solution.

In accordance with another embodiment, a sorbent for the removal of mercury from a gaseous flue stream prepared by a process comprising washing a sorbent with a washing solution so as to achieve an exchange of ions between the sorbent and the washing solution, and applying a halogen compound to the sorbent that has been washed with the washing solution to achieve a predetermined concentration of the halogen on the sorbent.

In accordance with another embodiment, the sorbent for the removal of mercury from a gaseous flue stream prepared by the process recited initially, wherein the sorbent is selected from the group consisting of mineral zeolites, synthetic zeolites, pumice, perlite, fly ash, alumina, diatomaceous earth, silicates, almuninosilicates, phyllosilicates, clay, peat, wood, lignocellulosic materials, biomass, waste, tires, olive pits, peach pits, corn hulls, rice hulls, lignite, brown coal, anthracite coal, bituminous coal, sub-bituminous coal, coconut shells, pecan shells, and walnut shells.

In accordance with another embodiment, the sorbent for the removal of mercury from a gaseous flue stream prepared by the process recited initially, wherein the sorbent is a zeolite and the zeolite is selected from the group consisting of chabazite, mordenite, erionite, faujasite, clinoptilolite, analcime, phillipsite, zeolite A, zeolite X, zeolite Y, zeolite L, zeolite omega, and ZSM-5.

In accordance with another embodiment, the sorbent for the removal of mercury from a gaseous flue stream prepared by the process recited initially, wherein the washing solution is an aqueous solution comprising a solute and the solute is selected from the group consisting of ammonium nitrate, ammonium bromide, ammonium carbonate, ammonium bicarbonate, ammonium chloride, ammonium perchlorate, ammonium hydroxide, ammonium sulfate, ammonium iodide, ammonium phosphate, and quarternary ammonium cations.

In accordance with another embodiment, the sorbent for the removal of mercury from a gaseous flue stream prepared by the process recited initially, wherein the washing solution comprises a greater than or equal to 0.001M ammonium nitrate or ammonium bromide solution.

In accordance with another embodiment, the sorbent for the removal of mercury from a gaseous flue stream prepared by the process recited initially, wherein washing the granularized zeolite with a washing solution comprises repeating the washing such that the sorbent receives a plurality of washes with the washing solution without reusing the washing solution between any of the plurality of washes.

In accordance with another embodiment, the sorbent for the removal of mercury from a gaseous flue stream prepared by the process recited initially, wherein the halogen compound is selected from the group consisting of bromine, chlorine, iodine, sodium bromide, calcium bromide, magnesium bromide, copper (II) bromide, iron (II) bromide, iron (III) bromide, zinc bromide, potassium bromide, copper (I) chloride, copper (II) chloride, iron (II) chloride, iron (III) chloride, and zinc chloride.

In accordance with another embodiment, the sorbent for the removal of mercury from a gaseous flue stream prepared by the process recited initially, wherein applying the halogen compound to the sorbent to achieve the predetermined concentration of the halogen on the sorbent comprises applying an aqueous solution comprising at least 20% sodium bromide by weight so as to achieve a final bromide concentration of at least 0.05% by weight.

In accordance with another embodiment, the sorbent for the removal of mercury from a gaseous flue stream prepared by the process recited initially, wherein applying the halogen compound to the sorbent to achieve the predetermined concentration of the halogen on the sorbent comprises spraying an aqueous solution onto the sorbent.

In accordance with another embodiment, the sorbent for the removal of mercury from a gaseous flue stream prepared by the process recited initially, further comprising milling the sorbent.

In accordance with another embodiment, the sorbent for the removal of mercury from a gaseous flue stream prepared by the process recited above, wherein the milled sorbent has a median particle diameter of approximately 20 micron on a volume basis.

In accordance with another embodiment, the sorbent for the removal of mercury from a gaseous flue stream prepared by the process recited initially, further comprising milling the sorbent and further comprising blending the milled sorbent with a second sorbent, wherein the second sorbent is an activated carbon.

In accordance with another embodiment, the sorbent for the removal of mercury from a gaseous flue stream prepared by the process recited initially, further comprising, prior to washing the sorbent with a washing solution, pre-washing the sorbent with a pre-washing solution so as to achieve an increase in the volume of pores of the sorbent with a pore size greater than or equal to 2 nanometers.

In accordance with another embodiment, the sorbent for the removal of mercury from a gaseous flue stream prepared by the process recited above, wherein the pre-washing solution is an aqueous solution comprising a solute and the solute is selected from a group consisting of sodium hydroxide, potassium hydroxide, calcium hydroxide, magnesium hydroxide, and ammonium hydroxide.

In accordance with another embodiment, the sorbent for the removal of mercury from a gaseous flue stream prepared by the process recited initially, further comprising, prior to washing the sorbent with a washing solution, pre-washing the sorbent with a pre-washing solution so as to achieve an increase in the volume of pores of the sorbent with a pore size greater than or equal to 2 nanometers and wherein the pre-washing solution comprises a greater than or equal to 0.05M sodium hydroxide solution.

In accordance with another embodiment, a method for removing mercury from a gaseous flue stream comprises introducing a sorbent to a gaseous flue stream, wherein the gaseous flue stream contains mercury, and facilitating removal of mercury from the gaseous flue stream by adsorption of the mercury onto the sorbent, wherein the sorbent comprises a sorbent washed with a washing solution so as to achieve an exchange of ions between the sorbent and the washing solution, treated with a halogen compound to achieve a predetermined concentration of the halogen compound on the sorbent, and milled to a size suitable for injection into the gaseous flue stream.

Certain embodiments of the present disclosure may provide one or more technical advantages. A technical advantage of one embodiment may include the ability to reduce or remove mercury from a flue gas stream using the treated sorbent. Technical advantages may also include the ability to use fly ash collected during the treatment of a flue gas stream, which contains sorbents treated in accordance with particular embodiments, in other applications, such as, as an additive to concrete. Fly ash containing treated sorbents may be a relatively more stable additive, and may demonstrate a reduced or minimal affinity for adsorption of air entrainment agents often found in concrete. Recycling fly ash containing treated sorbents in this manner may allow utility plants and other coal burning entities to profit from the sale of this by-product and avoid the cost of disposing of it in a landfill. In certain embodiments, the treated sorbent may perform as well or better than various untreated sorbents, resulting in additional environmental and economic advantages. In addition, certain sorbents suitable for treatment in accordance with particular embodiments, such as certain zeolites, may be easier to procure than other sorbents, so there may be economic, environmental, and logistical advantages to using them for this purpose.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present disclosure, its features and advantages, reference is now made to the following description, taken in conjunction with the accompanying drawings, in which.

DETAILED DESCRIPTION

Figure 1:
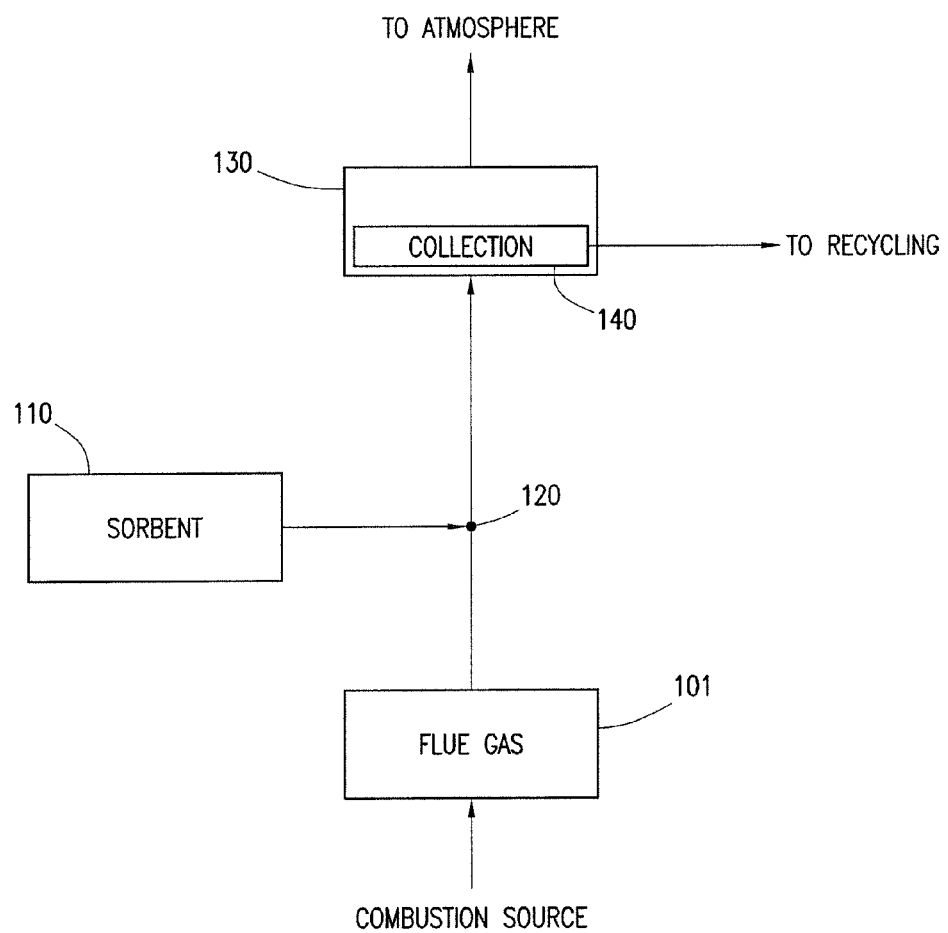
FIG. 1 illustrates a system for adding sorbents to flue gases in accordance with particular embodiments.

Embodiments of the present disclosure and its advantages are best understood by referring to FIGS. 1 through 5 of the drawings.

Utility plants often treat flue gases to reduce or remove various contaminants, such as sulfur oxides ($SO_x$), particulate matter (PM), and heavy metals, in order to comply with environmental and health-related regulations. Introducing a sorbent into a flue gas stream may allow for the reduction or removal of mercury, a heavy metal, through various chemisorption and physisorption phenomena. These sorbents are often captured in the particulate collective devices that are used by utility plants to capture PM, which is often present in the form of fly ash. Utility plants may consider recycling the collected fly ash due to the pozzolanic and cementitious properties of fly ash, e.g., the ability of the fly ash to demonstrate a binding characteristic in the presence of water and various hydraulic cements. See Dwight K. Smith, Cementing 7-17, 38-40 (5th prtg. 2003); Well Cementing 61-63 (Erik B. Nelson & Dominique Guillot eds., 2d ed. 2006). One option for recycling involves using collected fly ash as an additive in various building materials, for example, as a concrete additive. Because sorbent is captured with fly ash, the recycled content often necessarily includes fly ash and sorbent.

Activated carbon is a common sorbent used for the removal of mercury from flue gas streams. However, even after adsorbing mercury and/or other contaminants, certain activated carbons may remain capable of adsorption. In particular, when present in the recycled content used as a concrete additive, certain activated carbons may adsorb air entrainment agents, which are often added to concrete, especially in cold weather locations, to increase durability during freeze and thaw cycling. As a result, these activated carbons, when used as an additive, can compromise the integrity of concrete. For example, concrete made with additives containing these activated carbons may experience greater negative effects of freeze and thaw cycles, such as cracking. It has been challenging to develop a sorbent capable of sufficient rates of mercury adsorption that also has a minimal affinity for the adsorption of air entrainment agents.

Zeolites are a class of aluminosilicates. Zeolites are complex, crystalline inorganic polymer structures that include $AlO_4$ and $SiO_4$ tetrahedra linked through the sharing of oxygen ions. Known zeolites include synthetic and mineral zeolites, which are formed over much of the surface of the earth. Zeolites are typically microporous, i.e., with pore sizes ranging from approximately 0 to 2 nanometers, and may not demonstrate the porosity considered advantageous for removing mercury from flue gas, in particular mesoporosity, i.e., pore sizes ranging from approximately 2 to 50 nanometers, and/or macroporosity, i.e., pore sizes greater than approximately 50 nanometers. The present disclosure provides a method for treating zeolites to enhance their performance in adsorbing mercury. In various embodiments, the disclosed treatment process may also or alternatively be used to treat any sorbent such that it is operable to remove, reduce, and/or lower levels of contaminants, hazardous materials, and/or pollutants such as mercury, fly ash, acid gases, dioxins, furans, mercury-containing compounds, heavy metal compounds, and/or biological toxins from other polluted/contaminated fluids such as industrial fluids, exhaust gases, power plant emissions, blood or other biological fluids.

FIG. 1 illustrates a system for adding sorbents to flue gases in accordance with particular embodiments. System 100 provides a simplistic overview of a treatment process for flue gases.

Flue gas 101 results from the combustion of a raw material such as coal. The combustion of coal is a significant source of power in the United States and many other countries. Due to air quality and emissions regulations, utility plants that burn coal must often treat any flue gas to ensure it contains only certain levels of regulated compounds, like mercury.

Sorbent 110 is injected into the stream of flue gas 101 at injection point 120. Sorbent 110 may be a finely powdered material. In various embodiments, sorbent 110 may be a zeolite treated in the process described in conjunction with FIG. 2. In certain embodiments, sorbent 110 may be carbon based, for example a lignite-based activated carbon, and may be treated in a process similar to the process described in conjunction with FIG. 2.

Upon injection, sorbent 110 adsorbs mercury contained in flue gas 101. In various treatment processes, there may be an air preheater. The sorbent injection point may be upstream or downstream of the air preheater, or in certain treatment processes, there may be multiple injection points.

Downstream of injection point 120, flue gas 101 enters particulate collection device 130. Particulate collection device 130 filters out particulate matter, present in the form of fly ash, from flue gas 101. Particulate collection device 130 may also collect other substances present in the flue gas stream, including sorbent 110. Particulate collection device 130 may be any collection device suitable to collect particulate matter, such as fly ash, and/or spent sorbents, i.e. sorbents laden with impurities or pollutants adsorbed from the flue gas stream, including, for example, an electrostatic precipitator or a fabric filter (i.e., baghouse) application or other the devices listed by the United States Environmental Protection Agency in its module on "Air Pollutants and Control Techniques." *See*

*Module 6: Air Pollutants and Control Techniques—Particulate Matter—Characteristics*, U.S. Environmental Protection Agency, http://www.epa.gov/apti/bces/module6/matter/control/control.htm (last visited Jan. 11, 2013). Flue gas 101, once scrubbed by particulate collection device 130, is vented to the atmosphere. In certain treatment processes, this venting may occur through a stack.

Collection 140 contains the fly ash and sorbent 110 that is captured by particulate collection device 130. Collection 140 is removed from the particulate collection device 130 and recycled. In certain embodiments, collection 140 may be recycled as an additive for concrete or other building materials. In various embodiments, if sorbent 110 is a treated sorbent, such as a zeolite, collection 140 may be more likely to be recycled as a concrete additive, because a zeolite may be less likely to cause instability within the concrete. This recycling may provide economic benefits to a utility provider from the market value of the recycled material and/or from the avoidance of any disposal fee. It may also provide overall economic benefits to the concrete and/or construction industries by increasing the supply of suitable concrete additives. In addition, recycling collection 140 may produce environmental and land-use benefits by avoiding additional landfill volume. Further, recycling the material collected from a particulate collection device may create logistical benefits when recycling is easier than identifying a suitable disposal site. In embodiments where collection 140 is not recycled, it may be disposed or discarded.

Figure 2:
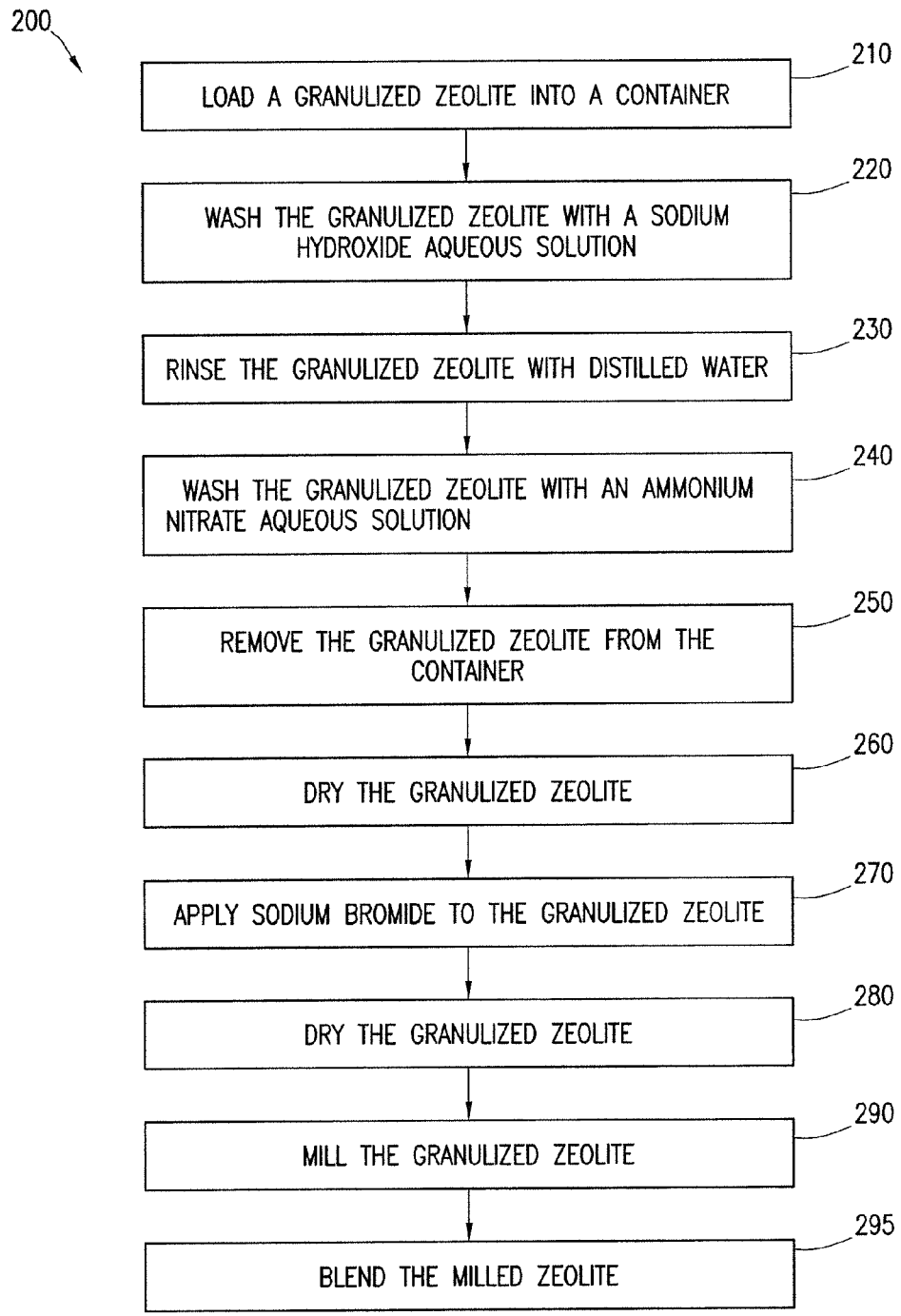
FIG. 2 illustrates a method for modifying the properties of a sorbent in accordance with particular embodiments.

FIG. 2 illustrates a method for modifying the properties of a sorbent in accordance with particular embodiments. In particular, method 200 includes steps for modifying the properties of a zeolite to improve its ability to remove mercury from a flue gas stream.

As described above, zeolites are crystalline aluminosilicates comprising a framework of linked $AlO_4$ and $SiO_4$ tetrahedra. Zeolites have porous structures and there are a variety of known structure types. Zeolites have a low affinity for adsorption of various air entrainment agents, including many of the agents used commercially in the concrete industry, which may make them valuable in applications where fly ash will be recycled as a concrete additive. In their natural state, zeolites primarily have micropores, i.e., pores measuring approximately 2 nanometers or less, and often lack surface functional groups useful to promoting mercury adsorption at high removal rates. For utility plants using electrostatic precipitators as their particulate collection device, the contact time between powdered sorbents being injected into the flue gas stream and mercury vapor can be very limited, ranging from one to ten seconds, and in particular between one to two seconds. Due to the limited residence time, rapid diffusion from the sorbent surface to an adsorption site is critical. Even in baghouse, or bag filter, applications, where contact time may be extended past the time allowed in an electrostatic precipitator, if a zeolite does not contain the appropriate surface functional groups and pore size distribution, mercury adsorption from a flue gas stream can be quite challenging. Method 200 details steps for modifying the properties of a zeolite to change its pore distribution and promote the development of meso- and macropores, to improve its surface reactivity, and to increase its oxidative potential such that it may better adsorb, oxidize, and ultimately remove mercury from a flue gas stream.

In step 210, a granularized zeolite is loaded into a container. In particular embodiments, the granularized zeolite may be a zeolite, such as, chabazite, mordenite, erionite, faujasite, clinoptilolite, analcime, or phillipsite, or may be a synthetic zeolite, such as zeolite A, zeolite X, zeolite Y, zeolite L, zeolite omega, or ZSM-5. In various embodiments, the container may be a glass column or other vessel suitable for a high temperature, caustic wash. In certain embodiments, the container will be appropriate to continuously receive and wash the granularized zeolite and discharge washed zeolite to downstream processing steps.

In step 220, the granularized zeolite is washed in a sodium hydroxide aqueous solution. In certain embodiments, the molarity of the sodium hydroxide solution may range from 0.05M to 3.0M, and in particular, from 0.1M to 0.2M. In particular embodiments, the solution may be an at least 0.05M sodium hydroxide solution and in certain embodiments, it may be approximately 0.1M sodium hydroxide solution. In various embodiments, the wash solution may be an aqueous solution with alternative caustic agent solutes, such as certain alkaline solutes, including potassium hydroxide, calcium hydroxide, magnesium hydroxide, or ammonium hydroxide. In certain embodiments, this washing may occur for a duration ranging from 2 hours to 24 hours, in particular, ranging from 2 hours to 6 hours, and further, from 2 hours to 5 hours, and from 2 hours to 3 hours. Washing the granularized zeolite may include feeding and re-circulating the sodium hydroxide solution at a flow rate sufficient to fluidize the granules. In some embodiments, the granularized zeolite may be washed in a vessel that allows for agitation, for example by a paddle agitator, or for stirring, for example by a continuous stirred-tank reactor. In particular embodiments, that washing may occur in a vessel that may be appropriate for soaking the zeolite in the caustic agent or in any vessel suitable to allow contact between the zeolite and the caustic agent. In certain embodiments, step 220 may be termed a pre-wash or pre-washing step.

Washing or pre-washing the granularized zeolite in accordance with step 220 removes silica from the zeolite. Removing silica acts to open the zeolite's pores, i.e., to change or alter the pore structure, thereby creating porosity and increasing the pore size distribution of the zeolite. In particular, removing silica may create or enhance the mesoporosity or the macroporosity, or both, of the zeolite. In various embodiments, this porosity is advantageous for removing mercury from flue gas in applications similar to the process described in conjunction with FIG. 1.

In step 230, the granularized zeolite is rinsed with distilled water. Rinsing the granules allows for their neutralization and may continue until the pH of the rinse water has dropped to a value between approximately 6 and 8, and in particular, to approximately 7. In method 200, rinsing occurs in the same container used in conjunction with steps 210 and 220. In certain embodiments, rinsing may occur in any suitable vessel. Further, in various embodiments, the granularized zeolite may not be rinsed with distilled water and, instead, may be rinsed with water of a different purity level, for example, potable water or steam condensate.

In step 240, the granularized zeolite is washed with an ammonium nitrate ($NH_4NO_3$) aqueous solution; this wash is repeated two additional times, such that the zeolite is washed with an ammonium nitrate solution three times. In certain embodiments, the molarity of the ammonium nitrate solution may range from 0.001M to 6.0M, and in particular, from 0.001M to 0.05M, from 0.05M to 1.0M, from 1.0M to 1.5M, from 1.5M to 2.0M, from 2.0M to 2.5M, from 2.5M to 3.0M, from 3.0M to 3.5M, or from 3.5M to 4.0M. In particular embodiments, the solution may be at least 0.001M. Each wash uses fresh or un-used solution. Further, in various embodiments step 240 may be modified to increase or decrease the number of times the granules are washed. The number of washes may be related to the concentration of the solution. For example, the granules may be washed three times in a 1.0M solution of ammonium nitration, two times in a 1.5M solution, or one time in a 3.0M solution. In certain embodiments, each wash may occur for approximately a duration ranging from 30 minutes to 24 hours, and in particular from 1 hour to 6 hours, and further, from 1 hour to 2 hours. It is believed that step 240 extracts calcium from the granularized zeolite. That is, ions such as calcium are exchanged with the wash solution. The extent of ion exchange or other zeolite processing is believed to depend in part on kinetic phenomena and is a function of the temperature and concentration of the wash solution, the number of washing cycles, and the duration of each cycle. In some embodiments, when adjusting any one of the concentration of the wash solution, the volume of wash solution for each wash cycle, and the number of wash cycles, the other two variables should be adjusted so that step 240 employs a desired mass ratio of ammonium nitrate (or other solute as described below) to zeolite, preferably from 0.1 to 1, for example from 0.1 to 0.3, from 0.3 to 0.5, from 0.5 to 0.7, or from 0.7 to 1. The temperature of the washing solution may be between the freezing point, e.g., at least 1° C. or at least 5° C. above the freezing point, and the boiling point of the washing solution, e.g., at least 1° C. or at least 5° C. below the boiling point, from 15 to 20° C., from 20 to 25° C., from 25 to 30° C., from 30 to 35° C., from 35 to 40° C., from 40 to 60° C., or from 60 to 80° C. In some embodiments, the temperature of the wash solution is not adjusted; rather, the wash solution is used "as is." One of skill in the art will understand that higher temperatures will result in faster kinetics; in addition, the temperature should be sufficiently high to dissolve the solute in the wash solution.

Washing the granularized zeolite may include feeding and re-circulating the ammonium nitrate solution at a flow rate sufficient to fluidize the granules. In method 200, washing with ammonium nitrate occurs in the container used in conjunction with steps 210 and 220. In some embodiments, the granularized zeolite may be washed in a vessel that allows for agitation, stirring, or soaking, or in any vessel suitable to allow contact between the zeolite and the washing solution.

In various embodiments, the washing solution may be an aqueous solution comprising a solute, where the solute is ammonium nitrate, as described in connection with FIG. 2, ammonium bromide, ammonium carbonate, ammonium bicarbonate, ammonium chloride, ammonium perchlorate, ammonium hydroxide, ammonium sulfate, ammonium iodide, ammonium phosphate, or quarternary ammonium cations.

Washing the granules may improve the adsorptive properties of the granules through ion or cation exchange, i.e., removing sodium ions from the zeolite and replacing them with ammonium ions. This ion exchange, which may occur on the surface of the granules or may occur within the crystalline structure of the granules, may improve the adsorptive properties of the zeolite by enhancing the granules' surface reactivity. Additionally or alternatively, washing the granules in accordance with step 240, may create or enhance the mesoporosity or the macroporosity, or both, of the zeolite, e.g., it may increase the volume of pores with a size of approximately 2 nm to 50 nm and/or of pores with a size of approximately 50 nm or more.

In step 250, the granularized zeolite is removed from the container. Once removed, in step 260, the granularized zeolite is dried. Drying may be done at any suitable temperature, ranging from room temperature to 500° C. In various embodiments, drying may occur in a convection oven, which may be heated, for example to a temperature ranging from 105° C. to 120° C. In certain embodiments, the granularized zeolite may be left in the convection oven to dry overnight. In certain embodiments, any suitable means to aid the drying process may be employed. Drying allows for improved handling of the granularized zeolite in subsequent steps. For example, when sodium bromide is applied, as described in step 270, sufficient drying of the granularized zeolite may allow for a more accurate calculation of the concentration of sodium bromide and/or for a more even application of the sodium bromide to the granularized zeolite.

In step 270, sodium bromide is applied to the granularized zeolite. In certain embodiments, sodium bromide may be applied by spraying an aqueous solution of sodium bromide onto the granules. The concentration of sodium bromide in the solution may vary in particular embodiments, and may range from 20% to 60% by weight, and in particular from 35% to 50%. In certain embodiments, the concentration of sodium bromide may be approximately 45% by weight. In particular embodiments, sodium bromide is added to the granularized zeolite so as to achieve a desired, final concentration of bromide by weight, which may range from 0.05% to 16%, and in particular, from 4% to 12%.

Treating the granularized zeolite with sodium bromide allows for oxidation which may improve the performance of the zeolite as a sorbent. High temperatures, such as the temperatures found in a flue gas stream, volatilize the bromine, allowing for the conversion of elemental mercury into a speciated form.

Sodium bromide may be applied in any suitable manner and may be applied to a batch of granules or may be applied in a continuous process. In certain embodiments, sodium bromide may be applied using a sprayer or atomizer, which atomizes the sodium bromide into droplets. The angle of spray of the atomizer should be broad enough to distribute sodium bromide to substantially all of the zeolite granules.

In particular embodiments, sodium bromide may be applied using a mixing vessel with a conical mixing chamber, also referred to as a cone. A mixing vessel with a conical mixing chamber may have a top portion that is a cylindrical chamber, a bottom portion that is a conical chamber, and one or more atomizers disposed toward the top end of the mixing vessel. The shape of the mixing vessel with the conical mixing chamber may allow for turbulence formation, which may improve the efficiency of mixing the granularized zeolite with atomized droplets of sodium bromide. And in certain embodiments, any vessel suitable to allow sodium bromide to be evenly applied to the granularized zeolite may be used, including, for example, a rotary dryer.

In various embodiments, sodium bromide may be replaced in step 270 with other chemical agents operable to increase the adsorption efficiency of the zeolite for one or more contaminants. A particular chemical agent suitable for treating the granularized zeolite may have a high affinity for a contaminant and, in some embodiments, may further be operable to adsorb, chemically bind, capture, and/or selectively bind a contaminant. Non-limiting examples of these agents may include halogens, sulfur, silver, or cations, such as aluminum, manganese, zinc, iron, lithium, calcium, magnesium, sodium, and potassium. In some embodiments, the granularized zeolite may be treated with a halogen. Exemplary halogens in aqueous phase may include fluorine, chlorine, bromine, and iodine. Halogen compounds may include acids such as, but not limited to, hydrochloric acid, bases, or salts, similar to the sodium bromide discussed above, including without limitation, calcium bromide, magnesium bromide, copper (II) bromide, iron (II) and iron (III) bromide, zinc bromide, potassium bromide, copper (I) and copper (II) chloride, iron (II) and iron (III) chloride, and zinc chloride. In various embodiments using ammonium bromide as the treating agent in step 240, step 270 may be omitted or the concentration or amount of chemical agent in step 270 may be reduced, because the ammonium bromide may improve the oxidative properties of the zeolite.

In step 280, the granularized zeolite is dried overnight. Drying may be done at any suitable temperature, ranging from room temperature to 500° C. In various embodiments, drying may occur in a convection oven, which may be heated, for example to a temperature ranging from 105° C. to 120° C. In certain embodiments, the granularized zeolite may be left in the convection oven to dry overnight. In certain embodiments, any suitable means to aid the drying process may be employed. Drying allows for improved handling of the granularized zeolite during milling.

Once dried, in step 290, the granularized zeolite is milled. The granules may be fed into a mill and milled, or ground, to any suitable size. A ball mill, ring mill, or any mill capable of particle size reduction may be used. As described in conjunction with FIG. 1, sorbents are often injected into a flue gas stream in a finely powdered form. In certain embodiments, the granules may be milled to a particle size suitable for injection into a flue gas stream, for example, the particles may range from a median particle diameter of 5 micron ($\mu$m) to 35 $\mu$m on a volume basis, and in particular, from 15 $\mu$m to 30 $\mu$m, and further, from 20 $\mu$m to 25 $\mu$m. In various embodiments, the granularized zeolite may be milled prior to the application of sodium bromide or other halogen compounds.

These treatment steps may produce a zeolite with an enhanced pore size distribution, including increased mesoporosity and macroporosity, an improved surface reactivity via cation exchange that allows for improved mercury adsorption, and an increase in oxidative potential such that the zeolite is highly effective at adsorbing, oxidizing, and ultimately removing mercury from a flue gas stream. In particular embodiments, these treatment steps will produce a sorbent capable of removing or reducing impurities in other industrial applications, such as water purification and spill clean-up, that require adsorption of larger molecular weight impurities or enhanced reactivity. In various embodiments, this treatment process may be applied to any adsorbent substrate and/or any solid support such as, mineral or synthetic zeolites, pumice, perlite, fly ash, alumina, diatomaceous earth, silicates, including almuninosilicates and phyllosilicates, clay, various polymers, and certain activated carbons, including without limitations activated carbons created from peat, wood, lignocellulosic materials, biomass, waste, tires, corn hulls, rice hulls, various coals, such as lignite, brown coal, anthracite coal, bituminous, and sub-bituminous coal, drupes, such as coconut shells, olive pits, and peach pits, and various nut-shells, such as pecan shells and walnut shells.

In step 295, the milled zeolite is blended with another sorbent. For example, in certain embodiments, the milled zeolite may be blended with activated carbon. Blending the zeolite with another sorbent, such as a lignite- or bituminous-based activated carbon, may improve conveyance of the product during injection into a flue gas stream. Sorbent blends with a treated zeolite and activated carbon may include activated carbon ranging from 1% to 75% by weight, and in particular, from 10% to 50%, and preferably do not demonstrate any adverse effects when collected with fly ash and used as a concrete additive, such as adsorbing air entrainment additives in the concrete and/or causing the concrete to crack. In certain embodiments, the granularized zeolite may be blended with another sorbent and then the blend is milled.

The potential impact of a sorbent, including these blends of treated zeolite and activated carbon, on concrete may be measured by a relative foam index test. In one exemplary foam index test, fly ash and water are mixed, and then an air entrainment agent is added until a stable foam is achieved. The fly ash is a Class C fly ash from a power plant that has been purified and from which any unburned carbon has been removed. The air entrainment agent is MB-VR Standard (concentrated vinsol-resin air-entraining admixture) from BASF Construction Chemicals. The number of drops of air entrainment agent is the baseline number for the test. To evaluate a sorbent, the sorbent is mixed with the fly ash and water and then the air entrainment agent is added until a stable foam is achieved. Subtracting the number of drops necessary for a stable foam from the baseline number provides a measurement that correlates to the likely stability of the sorbent as a concrete additive: the bigger the difference, the less stable the concrete is likely to be. A result of 6 or higher correlates to unacceptable adsorption of air entrainments. Using this test, a zeolite, which was washed with a 0.1M sodium hydroxide solution at 60° C. for 5 hours, rinsed, dried, washed with a 0.1M ammonium nitrate solution three times in succession, dried, sprayed with an aqueous solution of 45% sodium bromide to achieve a final bromide concentration of 12% by weight, dried, and milled, similar to the process described in FIG. 2, demonstrates a foam index of 0 (i.e., no difference from the pure fly ash and water mixture), whereas a fresh lignite-based activated carbon, i.e., one that has not yet been exposed to a flue gas stream, demonstrates a foam index of between 7 to 10, higher than the acceptable limit for use as a concrete additive. A sorbent blend that is 50% by weight treated zeolite and 50% lignite-based activated carbon demonstrates a foam index ranging between 2 and 3. This indicates that sorbent blends, including 50% by weight activated carbon, may also demonstrate acceptable foam index results and, thus, may be suitable as a concrete additive.

Using a zeolite prepared according to method 200 may provide numerous technical advantages. Zeolite is a naturally occurring material that may be procured at a price that provides economic benefits when compared to other sorbents. Because certain zeolites occur widely in quantity, it is possible that particular zeolites may be mined near facilities suitable to conduct the treatment process disclosed herein, thereby reducing logistic and transportation costs. Using zeolites in a blend with activated carbon may provide advantages by providing flexibility to a treatment facility based on current supply and demand of various products. Further, as described above, using a treated zeolite as the sorbent for removing mercury from flue gas allows the resulting fly ash to be recycled or sold as a concrete additive with less concern about any negative impact the sorbent may have on the concrete's performance and stability over time.

In various embodiments, method 200 may include other or additional steps. In certain embodiments the method used to treat zeolite may reorder or eliminate steps. For example, in certain embodiments, a zeolite suitable for mercury adsorption may be prepared with steps similar to 240 through 280, a process which omits the caustic wash described in step 220. Also, step 295 may be an optional step and may be omitted in particular embodiments. Other or additional steps described herein may be omitted with a positive or minimal effect.

Figure 3:
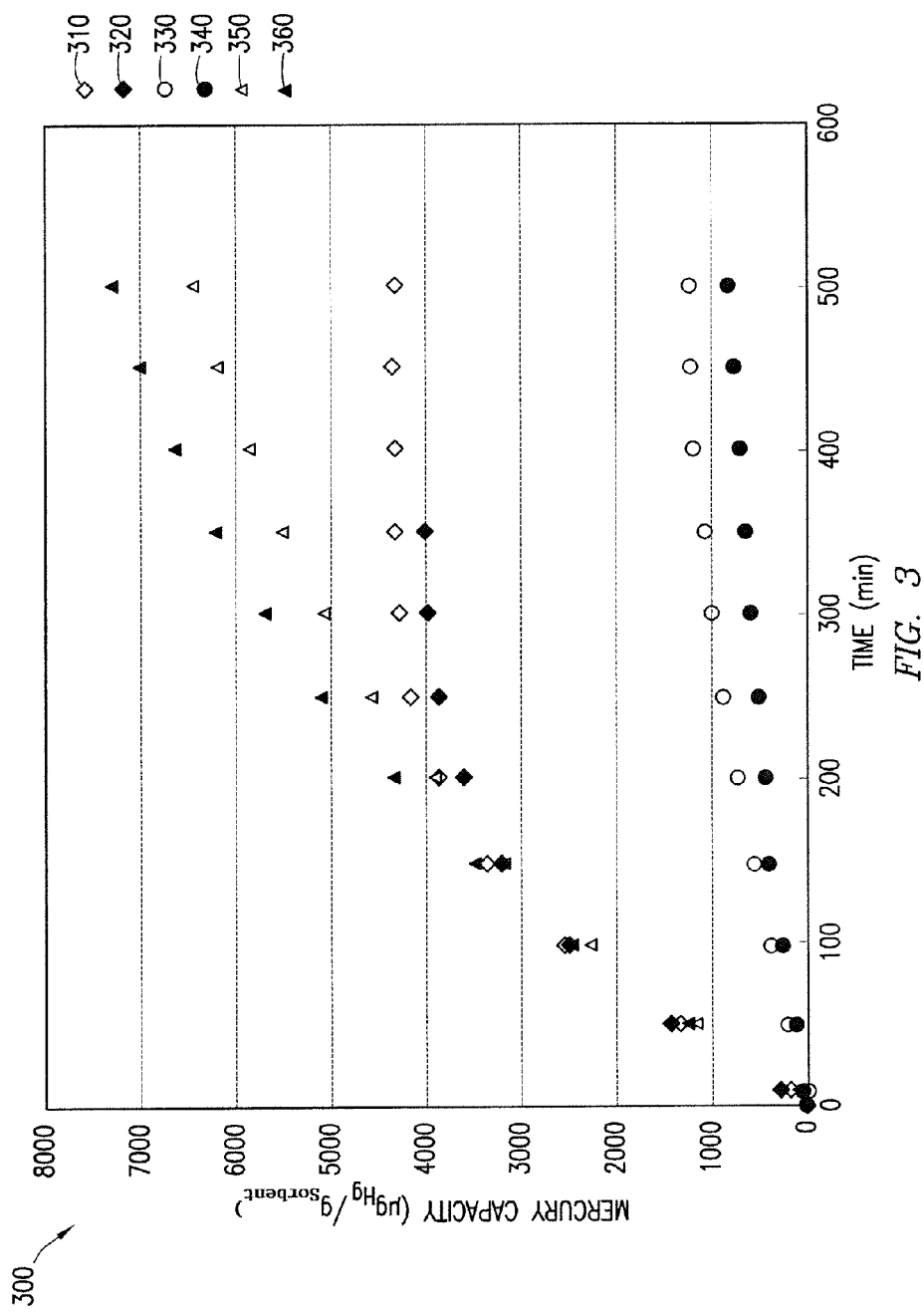
FIG. 3 illustrates the performance of various sorbents in a laboratory test in accordance with particular embodiments.

FIG. 3 illustrates the performance of various sorbents in a laboratory test in accordance with particular embodiments. As discussed in conjunction with FIGS. 1 and 2, a zeolite treated in accordance with various embodiments may allow for collected fly ash containing the zeolite to be recycled as a concrete additive. When considering whether to use the treated zeolite in flue gas applications, its capacity to adsorb mercury is also important.

Graph 300 provides measurements of the total mercury capacity of six sorbent samples over time. Samples 310 and 320 are lignite-based activated carbon commonly used in the industry, which were activated through a traditional, thermal activation process (i.e., not through the treatment method disclosed in conjunction with FIG. 2). Samples 330 and 340 are noncarbon, zeolite sorbents that were halogenated with bromine in a process similar to step 270 described in conjunction with FIG. 2, i.e., the zeolite sorbents were sprayed with an aqueous solution of approximately 45% sodium bromide to achieve a final bromide concentration of 12% by weight, dried, and milled. Samples 350 and 360 are noncarbon, zeolite sorbents prepared in a process similar to steps 210 through 280 described in conjunction with FIG. 2, i.e. the zeolite sorbents were washed with a 0.1M sodium hydroxide solution at 60° C. for 5 hours, rinsed, dried, washed with a 0.1M ammonium nitrate solution for two hours three times in succession (i.e., six hours total), dried, sprayed with an aqueous solution of approximately 45% sodium bromide to achieve a final bromide concentration of 12% by weight, dried, and milled.

To generate the data for Graph 300, the total mercury adsorption capacity of each sorbent sample was measured using a fixed-bed laboratory apparatus. In general, the laboratory apparatus includes a fixed-bed reactor, which is created by mixing 2.5 milligrams of the sorbent sample, in powdered form, with 5 grams of sized and purified sand and packed into a glass tube reactor. In order to predict more accurately the likely adsorption of the zeolite, the temperatures of the fixed-bed apparatus and the elemental mercury loaded air are selected to closely simulate the conditions at which the zeolite is likely to be injected into a flue gas stream. In this testing, the apparatus was maintained at approximately 325° F.

The bed is exposed to a simulated air stream containing a known concentration of elemental mercury ($Hg^0$) using laboratory purified air as the carrier gas. Mercury in the air outlet stream is converted to elemental mercury by a thermal mercury converter, operated at a temperature of approximately 1400° F. The inlet and outlet elemental mercury concentrations are continuously measured by an analyzer operable to measure the concentration of elemental mercury.

Comparing the elemental mercury in the outlet stream to the elemental mercury in the inlet stream, it is possible to calculate the total or cumulative amount of elemental mercury adsorbed by a sorbent by integrating the difference between the inlet and outlet elemental mercury concentration versus time using the trapezoidal rule. This cumulative value is also known as the equilibrium adsorption capacity.

Graph 300 presents total mercury capacity versus time measured using this fixed-bed apparatus and calculation method. The x-axis provides time in minutes, ranging from zero to 500 minutes. The y-axis provides total mercury capacity in micrograms of mercury ($\mu g_{Hg}$) adsorbed by every gram of sorbent (g sorbent).

As illustrated, the total mercury capacity for Samples 310 and 320, commonly used lignite-based activated carbon, is greater than or equal to 4000 $\mu g_{Hg}/g_{Sorbent}$ after 350 minutes. After 500 minutes, the total mercury capture is approximately 4200 $\mu g_{Hg}/g_{Sorbent}$ (only data from Sample 310 are available).

The total mercury capacity for Samples 330 and 340, zeolite halogenated with bromine, averages to approximately 1000 $\mu g_{ng}/g_{Sorbent}$ after 500 minutes.

Samples 350 and 360, zeolite prepared in a manner similar to steps 210 through 280 of method 200, each demonstrate a total mercury capacity of greater than 6000 $\mu g_{Hg}/g_{Sorbent}$ after 500 minutes, with an average value of approximately 7000 $\mu gn_{Hg}/g_{Sorbent}$.

Analyzing these results indicates that a zeolite sorbent treated with the hot, caustic sodium hydroxide wash, the ammonium nitrate ion exchange, and the bromine application as described in conjunction with FIG. 2, may adsorb a sufficient amount of mercury to make it a suitable sorbent for flue gas applications or other applications where mercury adsorption is required. In particular, Samples 350 and 360, the treated zeolite samples, show a significant increase in mercury adsorption in comparison to Samples 330 and 340. Comparing the average value of Samples 350 and 360 with the average value of Samples 330 and 340 at 500 minutes demonstrates an approximately 700% increase in total mercury capacity.

Samples 350 and 360 also show an increase in total mercury capacity when compared to lignite-based activated carbon. Comparing the average value of Samples 350 and 360 with Sample 310 at 500 minutes demonstrates an increase in total mercury capacity of as much as 67%.

In another example, a zeolite sample was prepared in a manner similar to that used to prepare Sample 350, except that a 0.3 M solution of ammonium bromide was substituted for the ammonium nitrate solution. Two washing cycles of three hours each were used, and the volume of the washing cycles were adjusted so that the total ratio of ammonium bromide to zeolite was 0.75 on a mass basis. The sample was tested using the fixed-bed laboratory apparatus used to produce the data for Graph 300. The mercury capacity at 500 minutes was 7483 $\mu g_{Hg}/g_{Sorbent}$. In comparison, the mercury capacity of a lignite-based activated carbon was 5484 $\mu g_{Hg}/g_{Sorbent}$ after 500 minutes.

In another example, zeolite samples were prepared in a manner similar to that used to prepare Sample 350, except that the total ratio of ammonium nitrate was varied among the samples, as was the concentration of the ammonium nitrate solution. Each sample was subjected to two three-hour washes, resulting in a total wash time of six hours. Where the concentration of the ammonium nitrate solution was varied, the amount of zeolite was also varied to maintain the mass ratio of ammonium nitrate to zeolite. Table 1 below gives the production conditions and the mercury capacity after 500 minutes of testing in the fixed-bed laboratory apparatus described in conjunction with Graph 300. In comparison with the adsorption of the lignite-based activated carbon described in conjunction with the ammonium bromide treatment above, the results show that both the ratio of ammonium nitrate to zeolite and the concentration of the washing solution can be varied while maintaining the superior mercury adsorption capacity of zeolite compositions treated according to various implementations of the invention.

TABLE 1

| [$NH_4NO_3$] in solution (M) | Number of wash cycles | Ratio (g $NH_4NO_3$/ g zeolite) | Hg capacity at 500 min (μg Hg/ g sorbent) |
| --- | --- | --- | --- |
| 0.06 | 1 | 0.37 | 7147 |
| 0.1 | 1 | 0.37 | 7439 |
| 0.3 | 1 | 0.37 | 6060 |
| 1 | 1 | 0.38 | 6890 |
| 0.3 | 2 | 0.75 | 7382 |

Figure 4:
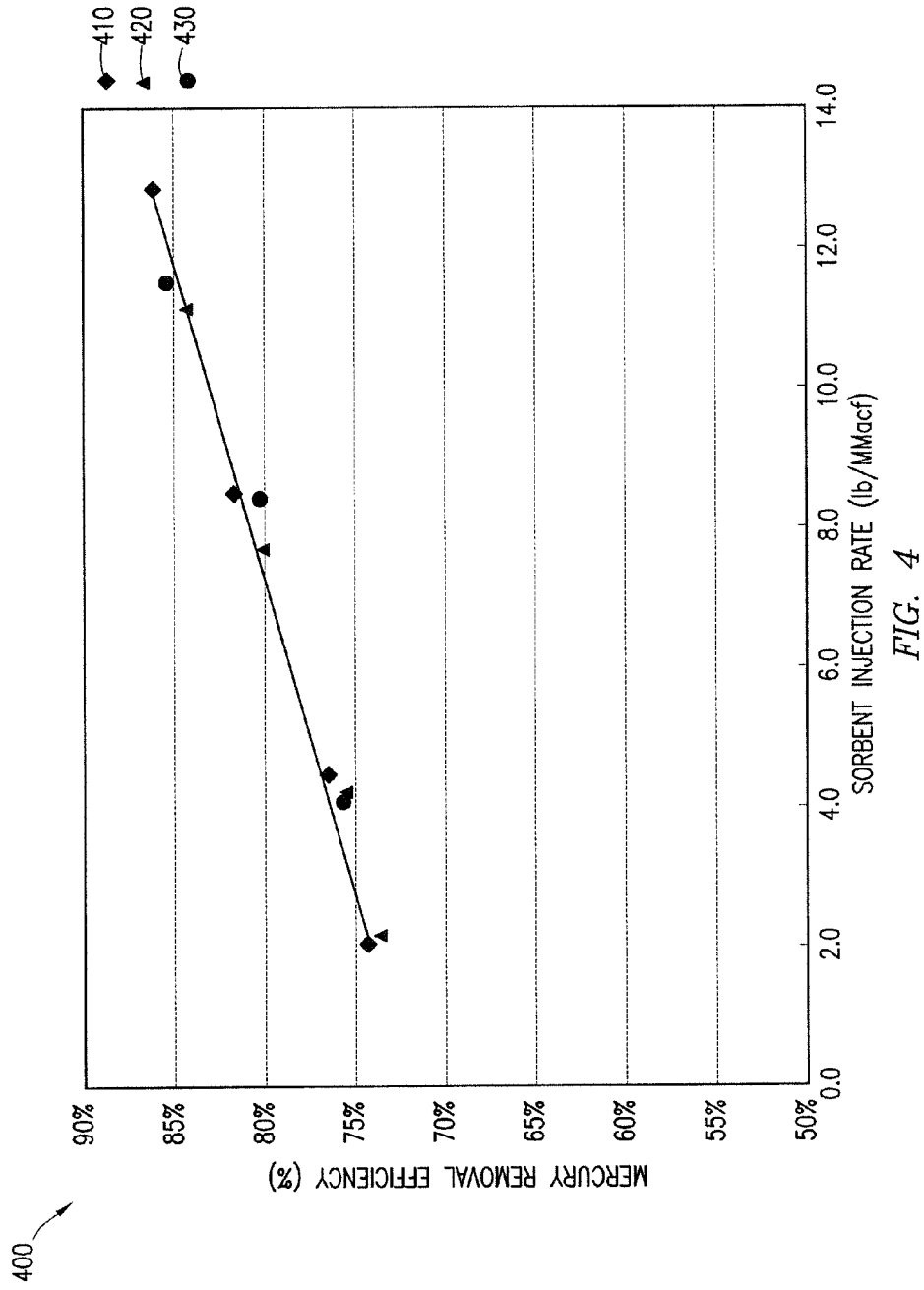
FIG. 4 illustrates the performance of various sorbents in a field test in accordance with particular embodiments.

FIG. 4 illustrates the performance of various sorbents in a field test in accordance with particular embodiments. Graph 400 charts the efficiency of mercury removal against the injection rate of a sorbent.

To better understand the performance of a treated zeolite, field testing was conducted in addition to the laboratory testing described in conjunction with FIG. 3. The field testing location includes a flue gas stream from a power plant with a flow rate of approximately 20,000 cubic feet per minute. The testing location includes an air preheater and an electrostatic precipitator ("ESP") for particulate matter control. The preheater is upstream from the ESP. Flue gas enters the preheater at approximately 673° F. and exits the preheater at a temperature of approximately 305° F. The flue gas enters the ESP at approximately this temperature, and exits the ESP at approximately 288° F.

For the field trials, sorbent was injected upstream of the preheater and ESP, which results in a residence time of approximately 2 seconds before entering the ESP. To ensure an accurate injection, a Norit PORTA PAC® injection unit was employed to control the conveyance and flow of the sorbent.

Using a continuous monitoring system, mercury content in the flue gas is measured. The system measures mercury in the flue gas both upstream and downstream of the electrostatic precipitator. As described in conjunction with FIG. 1, sorbent is collected in the electrostatic precipitator along with fly ash. Therefore, no additional mercury adsorption will occur downstream of the electrostatic precipitator. Hence, by measuring and comparing the mercury content in the flue gas upstream, i.e., generally pre-adsorption, and downstream, i.e., generally post-adsorption, it is possible to determine the mercury removal efficiency of a sorbent.

To generate data for Graph 400, the efficiency of mercury removal was calculated at various sorbent injection rates. The x-axis provides a sorbent injection rate measured in pounds of sorbent injected into the flue gas per million actual cubic feet of flue gas. The y-axis provides the efficiency of mercury removal for a sorbent on a percentage basis, i.e., the percent of mercury that enters the system and is removed by the sorbent or, in other words, the total amount of mercury adsorbed by the sorbent (the difference between mercury pre- and post-adsorption) over the amount of mercury pre-adsorption.

Sample 410 is a lignite-based activated carbon commonly used in the industry. Sample 420 includes a zeolite that was washed with a 0.1M ammonium nitrate solution for approximately one hour, the ammonium nitrate wash occurring three times in succession, dried, sprayed with an aqueous solution of 45% sodium bromide to achieve a final bromide concentration of 12% by weight, dried, and milled, similar to steps described in conjunction with FIG. 2. Sample 420 includes approximately 90% treated zeolite blended with approximately 10% activated carbon by weight. Sample 430 also includes a zeolite that washed with a 0.1M ammonium nitrate solution for approximately one hour, the ammonium nitrate wash occurring three times in succession, dried, sprayed with an aqueous solution of 45% sodium bromide to achieve a final bromide concentration of 12% by weight, dried, and milled, similar to steps described in conjunction with FIG. 2. Sample 430 includes approximately 50% treated zeolite and 50% activated carbon by weight.

At approximately two pounds of sorbent per million actual cubic feet ("MMacf") of flue gas, Sample 410 has a mercury removal efficiency over 70%. The mercury removal efficiency increases with an increasing sorbent injection rate, such that Sample 410 has an efficiency of over 85% at approximately 13 pounds per MMacf of flue gas.

Sample 420 also has a mercury removal efficiency over 70% at approximately two pounds of sorbent per MMacf of flue gas, and increases with an increasing sorbent injection rate, such that Sample 420 has an efficiency of almost 85% at approximately 12.0 pounds per MMacf of flue gas.

Sample 430 demonstrates a similar trend. At an injection rate of approximately 4 pounds of sorbent per MMacf of flue gas, Sample 430 achieved a mercury removal efficiency of approximately 75%, similar to Samples 410 and 420 at the same injection rate. At an injection rate of approximately 11 pounds of sorbent per MMacf of flue gas, Sample 430 achieved an efficiency of approximately 84%. At the same sorbent injection rate, Samples 410 and 420 provided similar results.

Figure 5:
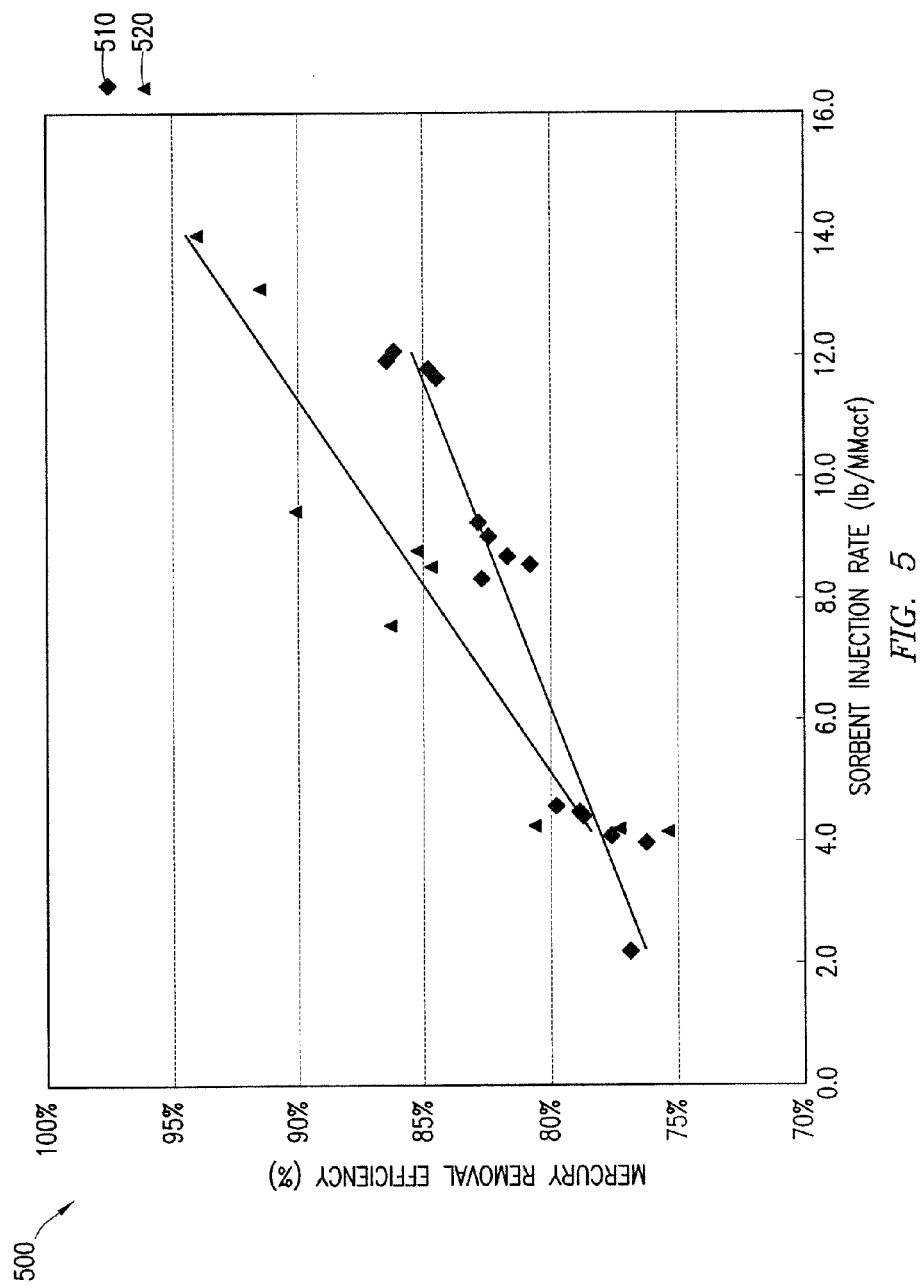
FIG. 5 also illustrates the performance of various sorbents in a field test in accordance with particular embodiments.

FIG. 5 also illustrates the performance of various sorbents in a field test in accordance with particular embodiments. Graph 500 charts the efficiency of mercury removal against the injection rate of a sorbent.

This testing was also conducted at the field testing location described in conjunction with FIG. 4. The location was operating under similar circumstances, including the flue gas with a flow rate of approximately 20,000 cubic feet per minute. The flue gas enters the pre-heater at approximately 673° F., exits the pre-heater at a temperature of approximately 305°, enters the ESP at approximately this temperature, and exits the ESP at approximately 288° F. Sorbet is injected upstream of the pre-heater and ESP, resulting in a residence time of approximately 2 seconds before entering the ESP. A continuous monitoring system measures the mercury content in the flue gas both upstream and downstream of the electrostatic precipitator. Because sorbent is collected in the electrostatic precipitator along with fly ash, no additional mercury adsorption will occur downstream of the electrostatic precipitator. Hence, by measuring and comparing the mercury content in the flue gas upstream, i.e., generally pre-adsorption, and downstream, i.e., post-adsorption, it is possible to determine the mercury removal efficiency of a sorbent.

To generate data for Graph 500, the efficiency of mercury removal was calculated at various sorbent injection rates. The x-axis provides a sorbent injection rate measured in pounds of sorbent injected into the flue gas per million actual cubic feet of flue gas. The y-axis provides the efficiency of mercury removal for a sorbent on a percentage basis, i.e., the percent of mercury by weight that enters the system and is removed by the sorbent or, in other words, the total amount of mercury adsorbed by the sorbent (the difference between mercury pre- and post-adsorption) over the amount of mercury pre-adsorption.

Sample 510 is a lignite-based activated carbon commonly used in the industry. Sample 520 includes a zeolite that was washed with a 0.15M ammonium nitrate solution for three hours, two times in succession, dried, sprayed with an aqueous solution of 45% sodium bromide to achieve a final bromide concentration of 12% by weight, dried, and milled, similar to steps described in conjunction with FIG. 2. Sample 520 includes approximately 88% treated zeolite blended with approximately 12% activated carbon.

At all measured sorbent injection rates, both Sample 510 and Sample 520 have a mercury removal efficiency over 75%, i.e. more than 75% of the mercury entering in the flue gas is adsorbed by the sorbents.

At approximately two pounds of sorbent per MMacf of flue gas, Sample 510 has a mercury removal efficiency of approximately 77%. The mercury removal efficiency generally increases with an increasing sorbent injection rate, such that Sample 510 has an efficiency of about 87% at approximately 12 pounds per MMacf of flue gas.

At approximately four pounds of sorbent per MMacf of flue gas, Sample 520 has a mercury removal efficiency of just over 75%. The mercury removal efficiency also increases with an increasing sorbent injection rate, such that Sample 520 has an efficiency of almost 95% at approximately 14 pounds per MMacf of flue gas.

The mercury removal efficiency of both Samples 510 and 520 range from approximately 75% to just over 80% at 4 pounds per MMacf of flue gas. At 8 pounds per MMacf of flue gas and higher, Sample 520 consistently demonstrates greater mercury removal efficiency. This may indicate that Sample 520, which includes 87% zeolite treated in accordance with various embodiments, i.e., washed with a 0.15M ammonium nitrate solution for three hours, two times in succession, dried, sprayed with an aqueous solution of 45% sodium bromide to achieve a final bromide concentration of 12% by weight, dried, and milled, similar to steps described in conjunction with FIG. 2, demonstrates equivalent and/or superior adsorption performance in comparison to certain activated carbons.

As stated previously, sorbents tested in the relative foam index test described in conjunction with FIG. 2 with a relative foam index test value of 6 or higher are not suitable as concrete additives because they adsorb air entrainment agents, which may lead to cracking in the concrete. Sample 510 has a test value of 5, while Sample 520 has a value of 0. This data indicate that Sample 520 is less likely to adsorb air entrainment agents than Sample 510, and therefore, is a better concrete additive.

The data demonstrate that a treated zeolite provides comparable performance to lignite-based activated carbon in removing mercury from flue gas. When performance is considered in conjunction with the ability to resist reacting with air entrainment agents, a treated zeolite may be a preferred sorbent for mercury removal from flue gas. Technical advantages of a treated zeolite thus include removing mercury from flue gas and allowing for collected fly ash to be recycled as a concrete additive. This may result in economic benefits, logistical benefits, procurement benefits, environmental benefits, safety benefits, and other or additional benefits.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for modifying the properties of a sorbent comprising:
    washing a sorbent with a washing solution so as to achieve an exchange of ions between the sorbent and the washing solution; and
    applying a halogen compound to the sorbent that has been washed with the washing solution to achieve a predetermined concentration of the halogen on the sorbent.

2. The method of claim 1, wherein the sorbent is selected from the group consisting of mineral zeolites, synthetic zeolites, pumice, perlite, fly ash, alumina, diatomaceous earth, silicates, almuninosilicates, phyllosilicates, clay, peat, wood, lignocellulosic materials, biomass, waste, tires, olive pits, peach pits, corn hulls, rice hulls, lignite, brown coal, anthracite coal, bituminous coal, sub-bituminous coal, coconut shells, pecan shells, and walnut shells.

3. The method of claim 1, wherein the sorbent is a zeolite and the zeolite is selected from the group consisting of chabazite, mordenite, erionite, faujasite, clinoptilolite, analcime, phillipsite, zeolite A, zeolite X, zeolite Y, zeolite L, zeolite omega, and ZSM-5.

4. The method of claim 1, wherein the washing solution is an aqueous solution comprising a solute and the solute is selected from the group consisting of ammonium nitrate, ammonium bromide, ammonium carbonate, ammonium bicarbonate, ammonium chloride, ammonium perchlorate, ammonium hydroxide, ammonium sulfate, ammonium iodide, ammonium phosphate, and quarternary ammonium cations.

5. The method of claim 1, wherein the washing solution comprises a greater than or equal to 0.001M ammonium nitrate or ammonium bromide solution.

6. The method of claim 1, wherein washing the granularized zeolite with a washing solution comprises repeating the washing such that the sorbent receives a plurality of washes with the washing solution without reusing the washing solution between any of the plurality of washes.

7. The method of claim 1, wherein the halogen compound is selected from the group consisting of bromine, chlorine, iodine, sodium bromide, calcium bromide, magnesium bromide, copper (II) bromide, iron (II) bromide, iron (III) bromide, zinc bromide, potassium bromide, copper (I) chloride, copper (II) chloride, iron (II) chloride, iron (III) chloride, and zinc chloride.

8. The method of claim 1, wherein applying the halogen compound to the sorbent to achieve the predetermined concentration of the halogen on the sorbent comprises applying an aqueous solution comprising at least 20% sodium bromide by weight so as to achieve a final bromide concentration of at least 0.05% by weight.

9. The method of claim 1, wherein applying the halogen compound to the sorbent to achieve the predetermined concentration of the halogen on the sorbent comprises spraying an aqueous solution onto the sorbent.

10. The method of claim 1, further comprising milling the sorbent.

11. The method of claim 10, wherein the milled sorbent has a median particle diameter of approximately 20 micron on a volume basis.

12. The method of claim 10, further comprising blending the milled sorbent with a second sorbent, wherein the second sorbent is an activated carbon.

13. The method of claim 1, further comprising, prior to washing the sorbent with a washing solution, pre-washing the sorbent with a pre-washing solution so as to achieve an increase in the volume of pores of the sorbent with a pore size greater than or equal to 2 nanometers.

14. The method of claim 13, wherein the pre-washing solution is an aqueous solution comprising a solute and the solute is selected from a group consisting of sodium hydroxide, potassium hydroxide, calcium hydroxide, magnesium hydroxide, and ammonium hydroxide.

15. The method of claim 13, wherein the pre-washing solution comprises a greater than or equal to 0.05M sodium hydroxide solution.

16. A sorbent for the removal of mercury from a gaseous flue stream prepared by a process comprising:
    washing a sorbent with a washing solution so as to achieve an exchange of ions between the sorbent and the washing solution; and
    applying a halogen compound to the sorbent that has been washed with the washing solution to achieve a predetermined concentration of the halogen on the sorbent.

17. The sorbent of claim 16, wherein the sorbent is selected from the group consisting of mineral zeolites, synthetic zeolites, pumice, perlite, fly ash, alumina, diatomaceous earth, silicates, almuninosilicates, phyllosilicates, clay, peat, wood, lignocellulosic materials, biomass, waste, tires, olive pits, peach pits, corn hulls, rice hulls, lignite, brown coal, anthracite coal, bituminous coal, sub-bituminous coal, coconut shells, pecan shells, and walnut shells.

18. The sorbent of claim 16, wherein the sorbent is a zeolite and the zeolite is selected from the group consisting of chabazite, mordenite, erionite, faujasite, clinoptilolite, analcime, phillipsite, zeolite A, zeolite X, zeolite Y, zeolite L, zeolite omega, and ZSM-5.

19. The sorbent of claim 16, wherein the washing solution is an aqueous solution comprising a solute and the solute is selected from the group consisting of ammonium nitrate, ammonium bromide, ammonium carbonate, ammonium bicarbonate, ammonium chloride, ammonium perchlorate, ammonium hydroxide, ammonium sulfate, ammonium iodide, ammonium phosphate, and quarternary ammonium cations.

20. The sorbent of claim 16, wherein the washing solution comprises a greater than or equal to 0.001M ammonium nitrate or ammonium bromide solution.

21. The sorbent of claim 16, wherein washing the granularized zeolite with a washing solution comprises repeating the washing such that the sorbent receives a plurality of washes with the washing solution without reusing the washing solution between any of the plurality of washes.

22. The sorbent of claim 16, wherein the halogen compound is selected from the group consisting of bromine, chlorine, iodine, sodium bromide, calcium bromide, magnesium bromide, copper (II) bromide, iron (II) bromide, iron (III) bromide, zinc bromide, potassium bromide, copper (I) chloride, copper (II) chloride, iron (II) chloride, iron (III) chloride, and zinc chloride.

23. The sorbent of claim 16, wherein applying the halogen compound to the sorbent to achieve the predetermined concentration of the halogen on the sorbent comprises applying an aqueous solution comprising at least 20% sodium bromide by weight so as to achieve a final bromide concentration of at least 0.05% by weight.

24. The sorbent of claim 16, wherein applying the halogen compound to the sorbent to achieve the predetermined concentration of the halogen on the sorbent comprises spraying an aqueous solution onto the sorbent.

25. The sorbent of claim 16, further comprising milling the sorbent.

26. The sorbent of claim 25, wherein the milled sorbent has a median particle diameter of approximately 20 micron on a volume basis.

27. The sorbent of claim 25, further comprising blending the milled sorbent with a second sorbent, wherein the second sorbent is an activated carbon.

28. The sorbent of claim 16, further comprising, prior to washing the sorbent with a washing solution, pre-washing the sorbent with a pre-washing solution so as to achieve an increase in the volume of pores of the sorbent with a pore size greater than or equal to 2 nanometers.

29. The sorbent of claim 28, wherein the pre-washing solution is an aqueous solution comprising a solute and the solute is selected from a group consisting of sodium hydroxide, potassium hydroxide, calcium hydroxide, magnesium hydroxide, and ammonium hydroxide.

30. The sorbent of claim 28, wherein the pre-washing solution comprises a greater than or equal to 0.05M sodium hydroxide solution.

31. A method for removing mercury from a gaseous flue stream comprising:
   introducing a sorbent to a gaseous flue stream, wherein the gaseous flue stream contains mercury; and
   facilitating removal of mercury from the gaseous flue stream by adsorption of the mercury onto the sorbent;
   wherein the sorbent comprises a sorbent washed with a washing solution so as to achieve an exchange of ions between the sorbent and the washing solution, treated with a halogen compound to achieve a predetermined concentration of the halogen on the sorbent, and milled to a size suitable for injection into the gaseous flue stream.

* * * * *